United States Patent [19]

Jones

[11] Patent Number: 4,988,120
[45] Date of Patent: Jan. 29, 1991

[54] CHASSIS SYSTEM FOR RACE VEHICLE WITH WHEELIE BARS

[76] Inventor: Anthony V. Jones, R.R. 5, Box 317, North Vernon, Ind. 47265

[21] Appl. No.: 409,739

[22] Filed: Sep. 20, 1989

[51] Int. Cl.$^5$ .......................... B60R 21/13; B60S 9/02
[52] U.S. Cl. .................................... 280/755; 280/767; 180/271
[58] Field of Search ............... 280/781, 727, 755, 293, 280/767, 301, 303, 239, 784; 180/282, 271; 293/6; 296/203

[56] References Cited

U.S. PATENT DOCUMENTS

| | | | |
|---|---|---|---|
| 3,284,096 | 11/1966 | Hansen et al. | 280/239 |
| 3,702,037 | 11/1972 | Toy et al. | 46/201 |
| 3,722,884 | 3/1973 | Brown | 273/1 |
| 3,806,149 | 4/1974 | Huszar | 280/106.5 |
| 3,840,241 | 10/1974 | Hock | 280/16 |
| 4,007,949 | 2/1977 | Norcia et al. | 280/767 |
| 4,095,817 | 6/1978 | Cohen | 280/87.04 |
| 4,154,452 | 5/1979 | Newman | 280/293 |
| 4,203,499 | 5/1980 | Miyata | 180/89.12 |
| 4,353,571 | 10/1982 | Anderson | 280/293 |
| 4,367,883 | 1/1983 | Anderson | 280/301 |

OTHER PUBLICATIONS

Hot Rod Magazine, Feb. 1964, p. 102.
Hot Rod Magazine, June 1965, p. 108 and 109.
Hot Rod Magazine, Oct. 1966, p. 74.
Hot Rod Magazine, Nov. 1966, p. 41.
Hot Rod Magazine, Apr. 1967, pp. 131.
Hot Rod Magazine, Jul. 1967, pp. 142 and 143.
Hot Rod Magazine, May 1970, p. 103.
Hot Rod Magazine, Feb. 1972, page entitled "Unmuffled Mayhem!".
Alston Race Car Engineering Catalog No. A25-188. 1987, pgs. 1, 15,19,20 and 21.
Jegster Race Car Chassis and Engine Kits Catalog, pp. 9 and 12.

Primary Examiner—Richard A. Bertsch
Assistant Examiner—Tamara L. Finlay
Attorney, Agent, or Firm—Baker & Daniels

[57] ABSTRACT

System for connecting an axle bracket of a race vehicle to the chassis of the vehicle. A first connecting member is connected to the axle bracket below the axle and extends forward to the chassis, and a second connecting member is connected to the axle bracket above the axle, and extends rearward to the chassis. This causes both connecting members to be in compression when the front end of the vehicle lifts upon rapid acceleration, and reduces chassis flex and improves the structural integrity of the chassis. The system may also include a wheelie bar connected by a third connecting member at an intermediate point of its length to the rear portion of the chassis. This improves traction of the rear wheels by reducing the load borne by the wheelie wheels when the contact the pavement.

16 Claims, 2 Drawing Sheets

CHASSIS SYSTEM FOR RACE VEHICLE WITH WHEELIE BARS

FIELD OF THE INVENTION

This invention relates to race vehicle chassis and, in particular, to race vehicles with wheelie bars to prevent the front end of the race car from lifting excessively during rapid acceleration.

BACKGROUND OF THE INVENTION

Wheelie bars are often used in race vehicles, which experience rapid acceleration, to prevent the front end of the race vehicle from lifting excessively. These devices usually include two wheelie wheels, located behind the rear wheel(s), which are each connected to an axle bracket near the rear wheel(s) of the vehicle. The wheelie wheels are connected together by a common wheelie wheel axle. The axle bracket is usually connected by two connecting bars to the portion of the chassis in front of the rear wheel. One of these connecting bars is usually connected to the axle bracket above the center of the rear wheel, while the other is connected at a point below the center of the rear wheel. This type of connection is termed a 4-link or 4-bar suspension. When the front end of the race vehicle accelerates and the front wheels are lifted from the ground, the axle bracket rotates slightly, causing the lower bar to be in compression, and the upper bar to be in tension. When the front wheels return to the ground, because one bar is in tension and the other bar is in compression, the chassis violently reacts to the sudden reduction in load, making it difficult to control the vehicle. This reaction is termed "chassis flex."

Another shortcoming of the 4-link connection system is that it concentrates the load associated with lifting of the front wheels on one portion of the chassis: that part directly in front of the rear wheel. Because the load is applied at one point, this part of the chassis is prone to losing its structural integrity. Therefore, the structural members adjacent to the connection point must be strengthened in order to disperse the load throughout the frame structure.

Finally, with conventional 4-link connection systems, the wheelie wheels bear a significant portion of the load of the vehicle, which reduces the traction of the rear wheel, thus reducing the energy that may be transferred to the pavement and reducing the acceleration of the vehicle.

SUMMARY OF THE INVENTION

The invention comprises a system for connecting an axle bracket to a chassis. An axle bracket includes an axle receiving means, and is connected to a frame structure including means for accommodating a rear wheel, said frame structure extending forward of the rear wheel accommodating means and rearward of the rear wheel accommodating means. A first connecting member extends from that portion of the axle bracket below the center of the axle receiving means to the portion of the frame structure that extends forward of the rear wheel. A second connecting member extends from that portion of the axle bracket above the center of the axle receiving means to the portion of the frame structure that extends rearward of the rear wheel. A wheelie bar extends rearwardly from the vehicle, and a third connecting member connects the rear portion of the frame structure to the wheelie bar, at a location between the forward and rear ends of the wheelie bar. The width of said wheelie bar may be greater at the middle and tapered towards its front and rear ends.

This configuration not only distributes the forces more evenly across the frame structure but, when the front end of the race car lifts off the pavement, all of the axle bracket connecting bars are in compression, as opposed to some bars being in compression and others being in tension. This improves the structural integrity of the chassis and helps reduce "chassis flex." The additional vertical member connecting the wheelie bar to the chassis also shifts more of the load of the car's weight from the wheelie wheel to the rear wheel, which increases traction.

Other objectives and advantages of this invention will be apparent from the following description and claims taken with the illustrative drawings. Such drawings are intended for illustration only, and considerable modification and variance therefrom will be possible without departing from the spirit and scope of the invention.

DESCRIPTION OF THE PREFERRED EMBODIMENT

Figure 1:
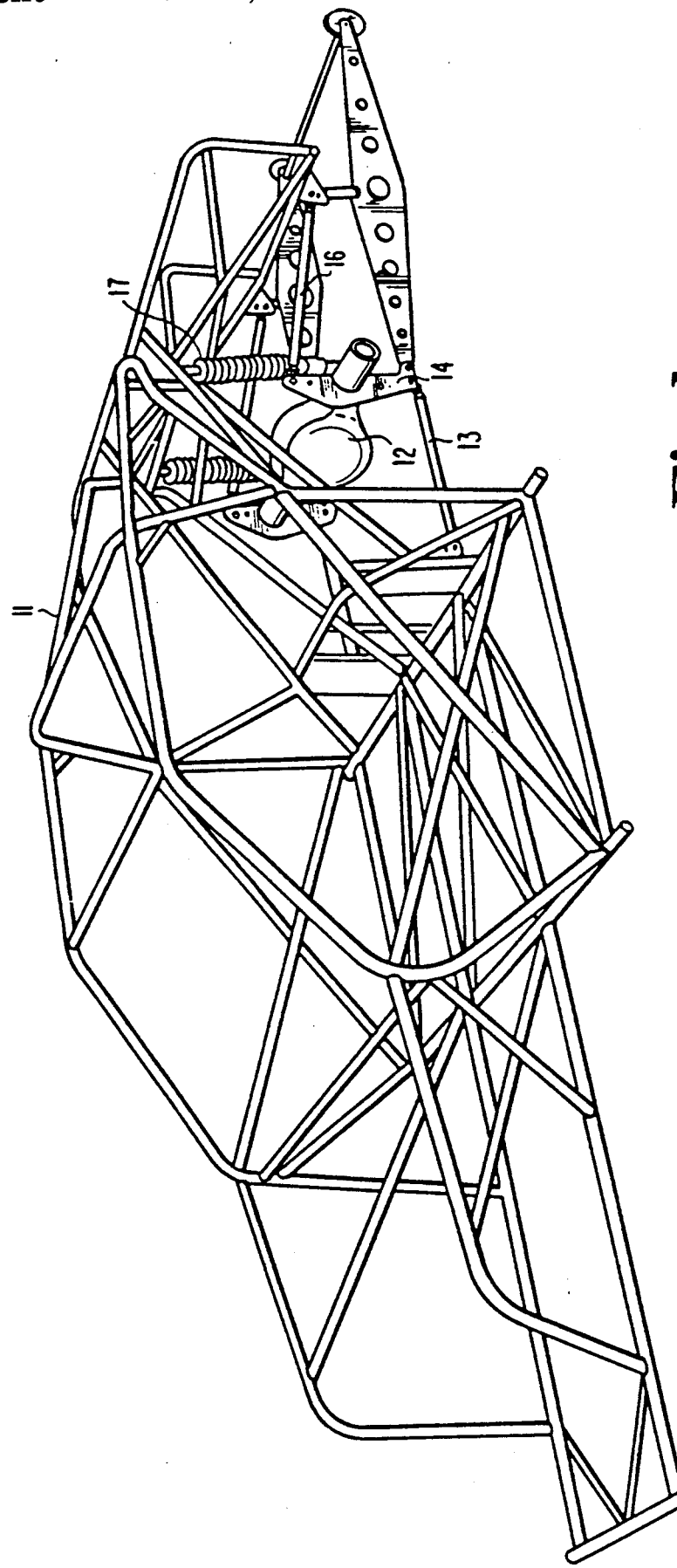
FIG. 1 is a perspective view of a race car chassis to which the invention may be applied.

Referring to the drawings, in FIG. 1 there is shown a race car chassis to which the apparatus of this invention may be applied. The race car chassis comprises a frame structure generally designated as 11 and has a rear axle housing 12 connected thereto by axle bracket 14 and first and second connecting members 13 and 16. Axle bracket 14 is attached to frame structure 11 in front of the rear wheel by first connecting member 13, and above and behind the rear wheel by second connecting member 16. The connecting members may comprise adjustable link tubes as used in conventional 4-link suspension systems in which one end is threadable into the opposite end. Axle bracket 14 is also connected to frame structure 11 by coil spring/shock absorber 17.

Figure 2:
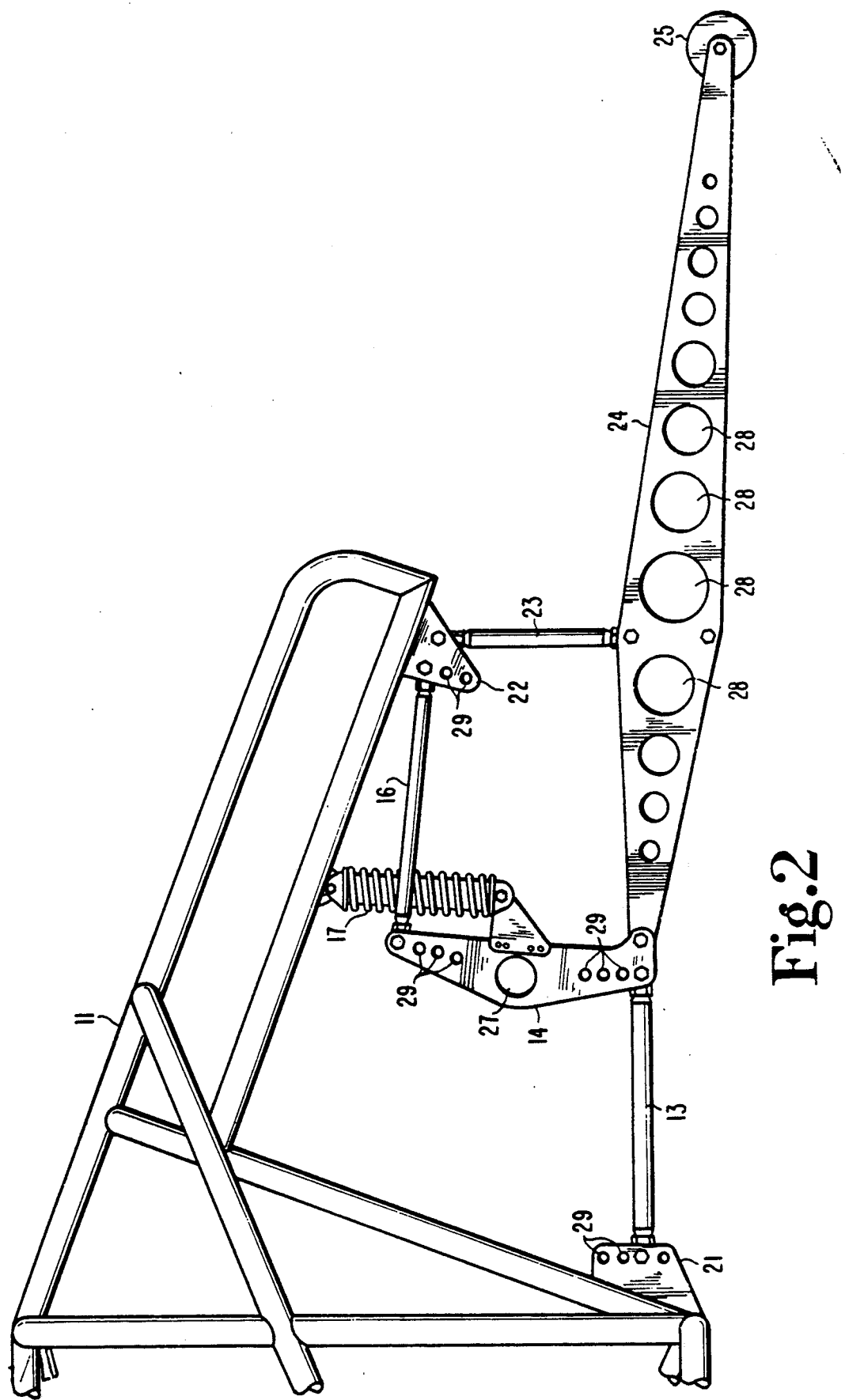
FIG. 2 is a horizontal view of one side of the rear chassis shown in FIG. 1.

Referring to FIG. 2, first connecting member 13 is connected to frame structure 11 forward of the rear wheel at connecting bracket 21 and connected to axle bracket 14 below the center of axle bracket hole 27, said axle bracket hole 27 providing a receiving means for the rear axle (not shown). Second connecting member 16 is connected to frame structure 11 rearward of the center of the rear wheel at connecting bracket 22, and connected to axle bracket 14 above the center of the axle bracket hole 27. Although not necessary, both first connecting member 13 and second connecting member 16 are adjustable in length in the preferred embodiment. Connecting brackets 21 and 22 and axle bracket 14 have selectable connection locations 29. Varying the connection point varies the load transfer distribution to frame structure 11. If first connecting member 13 is connected such that the rearward end is higher than the forward end, a downward force will be applied to frame structure 11 during rapid acceleration. Conversely, if the rearward end is lower than the forward end, an upward force will be applied to frame structure 11 during rapid acceleration. The ability to vary the distribution of load transferred to frame structure 11 enables the vehicle to be balanced so as to resist the additional torque on the left side of the vehicle developed during rapid acceleration. The left side of the vehicle receives greater torque due to the rotational direction of the drive shaft.

Wheelie bar 24 is connected to axle bracket 14 below the center of axle bracket hole 27, and to frame structure 11 rearward of the rear wheel by third connecting member 23. Third connecting member 23 should be vertical so as to efficiently transfer the load resulting from the lifting of the front end of the race car to frame structure 11. In the preferred embodiment, third connecting member 23 is located at a distance approximately one-third of the length of wheelie bar 24 from axle bracket 14, and may comprise a shock absorber or have other shock absorption means. The closer third connecting member 23 is located to axle bracket 14, the greater the percentage of the load resulting from the lifting of the front end that will be transferred to the rear wheel.

In the preferred embodiment, the width of wheelie bar 24 is greatest at the point where connecting member 23 is connected thereto, and tapered to both ends. This construction provides wheelie bar 24 with the maximum resisting moment at the point where it is connected to chassis 11 by third connecting member 23. Wheelie bar 24 also includes apertures 28 to reduce its weight. Although third connecting member 23 is adjustable in length and has a shock absorber energy absorption means in the preferred embodiment, such a limitation is not necessary. Wheelie wheel 25 is connected to the rearward end of wheelie bar 24.

During rapid acceleration, axle bracket 14 rotates clockwise and first and second connecting members 13 and 16 go into compression. If the acceleration is sufficient to cause the front wheels of the vehicle to lift, wheelie wheels 25 will move toward the ground. When wheelie wheel 25 contacts the ground, third connecting member 23 also goes into compression and the compressive force is increased in first and second connecting members 13 and 16. At this point, the load of the vehicle will be distributed by connecting members 13, 16 and 23 to portions of the chassis both forward of the rear wheels and behind the rear wheels. This load distribution reduces the stress placed on the connecting member junctions. The tapered configuration of the wheelie bar will permit it to resist bending due to the force applied to its middle section by the third connecting member. When the acceleration is no longer sufficient to lift the front end of the vehicle, the front wheels will return to the ground. At this point, first and second connecting members 13 and 16 will experience a rapid decrease in compressive load. Because first and second connecting members 13 and 16 are in compression, the chassis will not violently react to the sudden reduction in load, as when one bar is in tension and one bar is in compression. Therefore, the vehicle will be easier to control.

Although the present invention has been described with reference to the accompanying drawings, it is not limited to that precise embodiment, and various changes and modifications can be effected therein without departing from the scope or spirit of the invention.

I claim:

1. A vehicle chassis system comprising in combination:
   an axle bracket including means for receiving an axle,
   a frame structure including means for accommodating a rear wheel, said frame structure extending forward of the rear wheel accommodating means and rearward of the rear wheel accommodating means,
   a wheelie bar having forward and rear ends and connected to the axle bracket and extending rearwardly therefrom,
   a first connecting member connected to the axle bracket below the center of the axle receiving means of the axle bracket and connected to the portion of the frame structure that extends forward of the rear wheel,
   a second connecting member connected to the axle bracket above the center of the axle receiving means of the axle bracket and connected to the portion of the frame structure that extends rearward of the rear wheel, and
   a third connecting member connecting the rear portion of the frame structure to the wheelie bar, at a location between the forward and rear ends of the wheelie bar.

2. The chassis system of claim 1, wherein at least one of said connecting members is adjustable in length.

3. The chassis system of claim 1, wherein the frame structure includes means for connecting the first connecting member to the frame structure at a selectable location.

4. The chassis system of claim 1, wherein the frame structure includes means for connecting the second connecting member to the frame structure at a selectable location.

5. The chassis system of claim 1, wherein the axle bracket includes means for connecting the first connecting member to the axle bracket at a selectable location.

6. The chassis system of claim 1, wherein the axle bracket includes means for connecting the second connecting member to the axle bracket at a selectable location.

7. The chassis system of claim 1, wherein at least one of said connecting members includes energy absorption means.

8. The chassis system of claim 1, wherein said wheelie bar is tapered from the point where the third connecting member is connected thereto, to both ends.

9. The chassis system of claim 1, wherein said wheelie bar includes apertures.

10. The chassis system of claim 1, wherein said wheelie bar is tapered from the point where the third connecting member is connected thereto to one end of said wheelie bar.

11. A vehicle chassis system comprising in combination:
    an axle bracket including means for receiving an axle,
    a frame structure including means for accommodating a rear wheel, said frame structure extending forward of the rear wheel accommodating means and rearward of the rear wheel accommodating means,
    a plurality of connecting members connected between the axle bracket and frame structure such that each connecting member is in compression when rotational force is applied to the axle bracket such that the upper portion of the axle bracket is forced toward the rear of the vehicle and the lower portion of the axle bracket is forced toward the front of the vehicle.

12. The chassis system of claim 11, wherein said connecting members are adjustable in length.

13. The chassis system of claim 11, wherein the frame structure includes means for connecting at least one of said connecting members to the frame structure at a selectable location.

14. The chassis system of claim 11, wherein the axle bracket includes means for connecting said connecting members thereto at a selectable locations.

15. A wheelie bar comprising:
an elongate body having forward and rearward ends;
means at said forward end for connecting the wheelie bar to a vehicle;
means between said forward and rearward ends for connecting a connecting member to the wheelie bar;
the width of said wheelie bar being greater at the point of said connecting member means than at the forward and rearward ends.

16. The wheelie bar of claim 15, wherein the body of said wheelie bar includes apertures.

* * * * *